(12) United States Patent
Oyama et al.

(10) Patent No.: US 12,520,056 B2
(45) Date of Patent: Jan. 6, 2026

(54) PHOTOELECTRIC CONVERSION APPARATUS AND DEVICE FOR OUTPUTTING GRADATION AND EVENT PATTERNS AT DIFFERENT RATES

(71) Applicant: CANON KABUSHIKI KAISHA, Tokyo (JP)

(72) Inventors: Tohru Oyama, Kanagawa (JP); Jumpei Ashida, Cupertino, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 18/755,294

(22) Filed: Jun. 26, 2024

(65) Prior Publication Data
US 2025/0008236 A1    Jan. 2, 2025

(30) Foreign Application Priority Data
Jun. 30, 2023    (JP) .................................. 2023-107675

(51) Int. Cl.
| | | |
|---|---|---|
| H04N 25/47 | (2023.01) | |
| H04N 25/42 | (2023.01) | |
| H04N 25/46 | (2023.01) | |
| H04N 25/75 | (2023.01) | |
| H04N 25/77 | (2023.01) | |
| H04N 25/78 | (2023.01) | |

(52) U.S. Cl.
CPC ............. *H04N 25/47* (2023.01); *H04N 25/42* (2023.01); *H04N 25/46* (2023.01); *H04N 25/75* (2023.01); *H04N 25/77* (2023.01); *H04N 25/78* (2023.01)

(58) Field of Classification Search
CPC ........ H04N 25/47; H04N 25/42; H04N 25/46; H04N 25/75; H04N 25/77; H04N 25/78
See application file for complete search history.

(56) References Cited

U.S. PATENT DOCUMENTS

| | | | |
|---|---|---|---|
| 11,394,905 B2 * | 7/2022 | Wong | H04N 25/42 |
| 2021/0185264 A1 * | 6/2021 | Wong | H04N 23/61 |
| 2021/0185265 A1 * | 6/2021 | Wong | H04N 25/41 |
| 2022/0201204 A1 | 6/2022 | Hirata | |
| 2024/0040271 A1 | 2/2024 | Mitsuma | |

FOREIGN PATENT DOCUMENTS

| | | |
|---|---|---|
| JP | 2019140650 A | 8/2019 |
| JP | 2020162000 A | 10/2020 |
| JP | 2022108329 A | 7/2022 |
| JP | 2023087378 A | 6/2023 |

* cited by examiner

*Primary Examiner* — Nicholas G Giles
(74) *Attorney, Agent, or Firm* — Canon U.S.A., Inc. IP Division

(57) ABSTRACT

A conversion apparatus includes a pixel array unit in which a plurality of first pixels that generates gradation signals indicating amounts of incident light and a plurality of second pixels that generates event signals are two-dimensionally disposed, a reading unit configured to read the gradation signals and the event signals from the pixel array unit, and a control unit configured to change an output data rate of the gradation signals and an output data rate of the event signals, wherein a first pattern for outputting the gradation signals at a first output data rate and outputting the event signals at a second output data rate and a second pattern for outputting the gradation signals at a third output data rate different from the first output data rate and outputting the event signals at a fourth output data rate different from the second output data rate are switched.

20 Claims, 8 Drawing Sheets

| OPERATION MODE | SETTING TYPE | GRADATION PIXELS | | EVENT PIXELS | |
|---|---|---|---|---|---|
| | | REGION A | REGION B | REGION A | REGION B |
| NORMAL MODE | BINNING PROCESS | ABSENT | ABSENT | ABSENT | ABSENT |
| | READING CYCLE (ms) | 16.7 | 16.7 | 1.0 | 1.0 |
| RUNNING-OUT DETECTION MODE | BINNING PROCESS | ABSENT | PRESENT (2 × 2) | ABSENT | ABSENT |
| | READING CYCLE (ms) | 16.7 | 16.7 | 1.0 | 0.5 |

| OPERATION MODE | SETTING TYPE | GRADATION PIXELS | | EVENT PIXELS | |
|---|---|---|---|---|---|
| | | IMPORTANT REGION | REGION D | IMPORTANT REGION | REGION D |
| NORMAL MODE | BINNING PROCESS | ABSENT | ABSENT | ABSENT | ABSENT |
| | READING CYCLE (ms) | 100.0 | 100.0 | 1.0 | 1.0 |
| DYNAMIC BODY TRACKING MODE | BINNING PROCESS | ABSENT | NO OUTPUT | NO OUTPUT | ABSENT |
| | READING CYCLE (ms) | 25.0 | NO OUTPUT | NO OUTPUT | 2.0 |

PHOTOELECTRIC CONVERSION APPARATUS AND DEVICE FOR OUTPUTTING GRADATION AND EVENT PATTERNS AT DIFFERENT RATES

BACKGROUND

Technical Field

The aspect of the embodiments relates to a photoelectric conversion apparatus and a device.

Description of the Related Art

With the prevalence of the Internet of Things (IoT), artificial intelligence (AI), and automatic driving in recent years, image sensors that consume lower power and are faster than conventional image sensors are required. One of these image sensors is an event-based sensor (or termed a "dynamic vision sensor"). The publication of Japanese Patent Application Laid-Open No. 2019-140650 discusses a solid-state image sensor that generates a gradation signal and an event signal.

In a photoelectric conversion apparatus that generates a gradation signal and an event signal, however, the optimization of an operation when the signals are output is not sufficiently considered.

SUMMARY

According to an aspect of the embodiments, there is provided a conversion apparatus includes a pixel array unit in which a plurality of first pixels that generates gradation signals indicating amounts of incident light and a plurality of second pixels that generates event signals are two-dimensionally disposed, a reading unit configured to read the gradation signals and the event signals from the pixel array unit, and a control unit configured to change an output data rate of the gradation signals and an output data rate of the event signals, wherein a first pattern for outputting the gradation signals at a first output data rate and outputting the event signals at a second output data rate and a second pattern for outputting the gradation signals at a third output data rate different from the first output data rate and outputting the event signals at a fourth output data rate different from the second output data rate are switched.

Further features of the disclosure will become apparent from the following description of exemplary embodiments with reference to the attached drawings.

DESCRIPTION OF THE EMBODIMENTS

Exemplary embodiments will be described below with reference to the drawings. The following exemplary embodiments do not limit the disclosure according to the appended claims. Although a plurality of features is described in the exemplary embodiments, not all the plurality of features is essential for the disclosure, and the plurality of features may be optionally combined together. Further, in the attached drawings, the same or similar components are designated by the same reference numbers, and are not redundantly described. In the following exemplary embodiments, a sensor for imaging is mainly described as an example of a photoelectric conversion apparatus. The exemplary embodiments, however, are not limited to a sensor for imaging, and are also applicable to other examples of the photoelectric conversion apparatus. The other examples include an imaging apparatus, a distance measuring apparatus (an apparatus that measures a distance using focus detection or time of flight (ToF)), and a photometric apparatus (an apparatus that measures the amount of incident light).

With reference to FIGS. 1 to 5B, a photoelectric conversion apparatus 100 according to a first exemplary embodiment of the disclosure is described.

Figure 1:
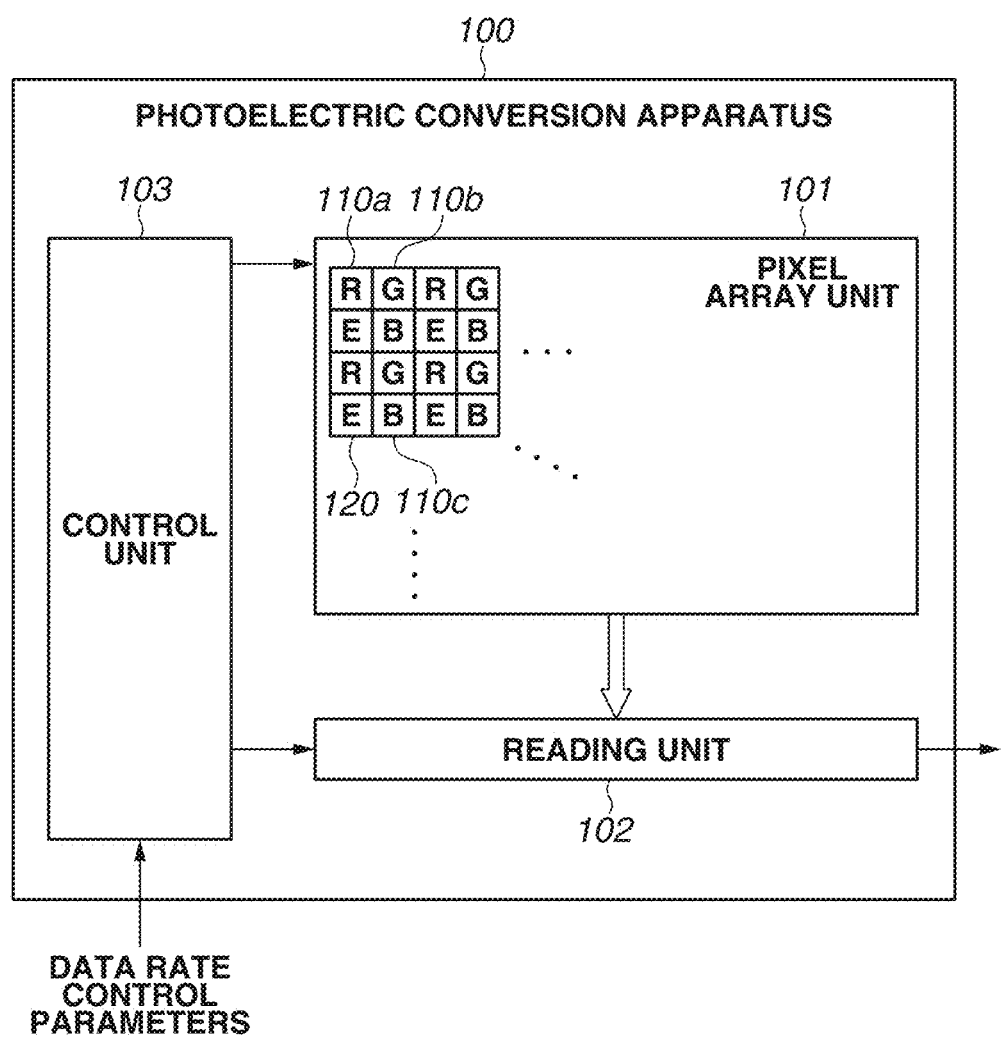
FIG. 1 is a block diagram illustrating a photoelectric conversion apparatus according to a first exemplary embodiment.

FIG. 1 illustrates an example of a block diagram of the photoelectric conversion apparatus 100 according to the present exemplary embodiment.

As illustrated in FIG. 1, the photoelectric conversion apparatus 100 includes a pixel array unit 101, a reading unit 102, and a control unit 103. In the pixel array unit 101, a plurality of pixels is two-dimensionally disposed to form a plurality of rows and a plurality of columns. The plurality of pixels includes photoelectric conversion units that generate and accumulate signal charges based on incident light, and each of the photoelectric conversion units outputs signal charges according to incident light. The plurality of pixels also includes gradation pixels 110 (first pixels) that generate gradation signals indicating the amounts of incident light, and event pixels 120 (second pixels) that generate event signals. In the pixel array unit 101, for example, the gradation pixels 110 and the event pixels 120 are disposed in a mixed manner in a two-dimensional array.

The event signals are signals generated in a case where the event pixels 120 detect an event where the amounts of light rapidly change. For example, the event can be local changes in the amount of light caused by a change in the position of an object in an imaging range.

On each pixel, a microlens and a color filter can be placed. An R-pixel 110a, a G-pixel 110b, and a B-pixel 110c disposed in the pixel array unit 101 indicate gradation pixels 110 that receive light through red, green, and blue color filters, respectively. The types of the color filters used in the gradation pixels 110 are merely examples, and color filters of other colors may be used. For example, a color filter of a complementary color may be used, and cyan, magenta, and yellow color filters may be used. A clear pixel may be disposed without using a color filter. Then, an E-pixel 120 indicates an event pixel 120. The event pixel 120 can be configured without a color filter to give priority to sensitivity in a dark place. The event pixel 120, however, may also be configured to receive light through a color filter of any color to acquire color information. The arrangement of the gradation pixels 110 and the event pixels 120 indicated in the pixel array unit 101 is merely an example. Although the event pixels 120 are placed such that, for example, one out of every four pixels is an event pixel 120, any other proportion may be employed. For example, the event pixels 120 may be placed such that one out of every 16 pixels is an event pixel 120. The arrangement of the pixels may be any other placement. Further, each of the plurality of pixels disposed in the pixel array unit 101 may be able to generate a gradation signal indicating the amount of incident light and an event signal indicating a change in the amount of the incident light.

The reading unit 102 sequentially reads each of the gradation pixels 110 and the event pixels 120 disposed in the pixel array unit 101 and outputs a signal to outside the photoelectric conversion apparatus 100. For example, the reading unit 102 may be able to read signals output from a plurality of pixels on a row-by-row basis in parallel. For example, regarding the event pixels 120, the reading unit 102 may skip and not read a row where an event does not occur. In this case, the reading unit 102 may output signals by adding a row address to each row to clarify the positions of pixels where an event occurs. Similarly, also regarding the column direction, the reading unit 102 can skip and not read a region where an event does not occur, and output event signals by further adding a column address to each column.

The control unit 103 controls the pixel array unit 101 and thereby can control the reading cycles and the binning processing methods of the gradation pixels 110 and the event pixels 120. The control unit 103 also controls the reading unit 102 and thereby can control the reading cycles and the binning processing methods of the gradation pixels 110 and the event pixels 120. The control unit 103 decreases the reading cycles and thereby can decrease the time resolution of at least either corresponding gradation signals or event signals. That is, the control unit 103 controls the reading cycles and thereby can control the time resolutions of gradation signals and event signals to be output to be variable. The control unit 103 also increases the number of pixels on which a binning process is performed, and thereby can decrease the space resolution of at least either corresponding gradation signals or event signals. That is, the control unit 103 controls the binning processing methods and thereby can control the space resolutions of gradation signals and event signals to be output to be variable. Based on the above, for example, the control unit 103 changes at least one of the space resolutions and the time resolutions of signals to be output and thereby can change the output data rate of gradation signals and the output data rate of event signals. The output data rate of the gradation signals is the data rate at which the gradation signals are output from the pixel array unit 101 through the reading unit 102 to outside the photoelectric conversion apparatus 100. The output data rate of the event signals is the data rate at which the event signals are output from the pixel array unit 101 through the reading unit 102 to outside the photoelectric conversion apparatus 100. In a case where a plurality of lanes from which signals can be output is present at the boundary between the photoelectric conversion apparatus 100 and the outside of the photoelectric conversion apparatus 100, the output data rate indicates the maximum data rate at which the signals are output using the plurality of lanes. A description will be given below of the details of the technique in which the control unit 103 controls the binning processing methods by controlling the pixel array unit 101 or the reading unit 102.

That the control unit 103 controls the reading cycle of a signal by controlling the pixel array unit 101 means that the reading cycle of reading at least either gradation signals or event signals from the pixel array unit 101 to the reading unit 102 is changed.

That the control unit 103 controls the reading cycle of a signal by controlling the reading unit 102 means that the reading cycle of reading at least either gradation signals or event signals from the reading unit 102 to outside the photoelectric conversion apparatus 100 is changed. For example, the reading cycle can be changed by reading signals from the pixel array unit 101 to the reading unit 102 in a constant cycle and then performing an averaging or thinning process on the signal amount of the signals in the time direction in the reading unit 102. The averaging of the signal amount of the signals in the time direction refers to a reduction in the cycle of outputting the signals by performing an addition averaging process on signals output at different timings from the same pixel. The above process is not limited to signals output at different timings from the same pixel, and may be performed on signals output at different timings from the same region including a plurality of pixels. In a case where event signals are averaged in the time direction, then regarding the result of reading event signals in a plurality of cycles, a pixel where one or more events occur is regarded as the occurrence of a single event, and a pixel where no event occurs is regarded as the non-occurrence of an event. Then, the event signals are converted into event signals obtained by newly regarding the plurality of cycles as a single cycle.

The pixel array unit 101 can be divided into a plurality of pixel regions, each including at least one of the gradation pixels 110 and at least one of the event pixels 120. The control unit 103 can control the binning processing method and the reading cycle of the gradation pixels 110 and the binning processing method and the reading cycle of the event pixels 120 with respect to each of the plurality of divided pixel regions. For example, the binning processing methods and the reading cycles with respect to each of the plurality of divided pixel regions can be set in advance as output data rate control parameters for the control unit 103 from outside the photoelectric conversion apparatus 100.

The control unit 103 may include a vertical scanning circuit. The vertical scanning circuit controls the gradation pixels 110 and the event pixels 120 with respect to each pixel row, thereby performing vertical scanning for reading signals from corresponding pixels.

Figure 2:
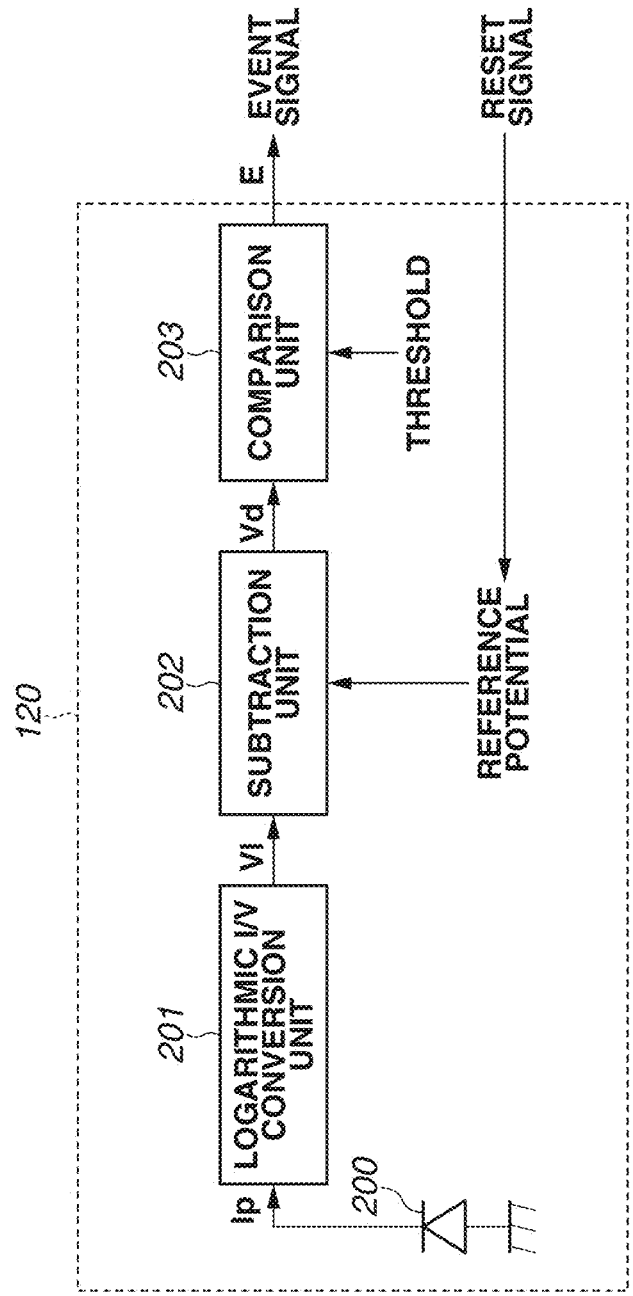
FIG. 2 is a block diagram illustrating the photoelectric conversion apparatus according to the first exemplary embodiment.

FIG. 2 illustrates an example of a block diagram of each of the event pixels 120 included in the photoelectric conversion apparatus 100 according to the present exemplary embodiment.

As illustrated in FIG. 2, a single event pixel 120 includes a photodiode 200, a logarithmic current-to-voltage (I/V) conversion unit 201, a subtraction unit 202, and a comparison unit 203.

In the event pixel 120, the photodiode 200 generates a photocurrent Ip according to the amount of incident light. For example, the logarithmic I/V conversion unit 201 converts the photocurrent Ip into a potential and also obtains a logarithmic potential V1 by converting the potential using a logarithmic function. The output V1 of the logarithmic I/V conversion unit 201 does not necessarily need to be a logarithmic potential, and may adopt another value that changes according to the amount of light, such as a potential that linearly changes according to the amount of incident light.

The subtraction unit 202 calculates a difference Vd between the logarithmic potential V1 and a reference potential. The comparison unit 203 compares the difference Vd calculated by the subtraction unit 202 and a predetermined threshold. As the threshold used by the comparison unit 203, two thresholds, namely a positive threshold T1 and a negative threshold T2, are used. If the difference Vd exceeds the positive threshold T1 or falls below the negative threshold T2, an event signal having a value different from a value of 0 is generated and detected as an event. An event signal E of a pixel P(x,y) at a time t can be represented using the following expression (1).

$$E(x, y, t) = \begin{cases} 1 (v_d > T1) \\ -1 (v_d < T2) \\ 0 \text{ (otherwise)} \end{cases} \quad (1)$$

The time resolution of the detection of an event in the event pixel 120 at the time t is 1 µs, for example. If the value of the event signal E is 1, the event signal E indicates the occurrence of a change in which the event pixel 120 becomes bright, i.e., the occurrence of an on event. If the value of the event signal E is −1, the event signal E indicates the occurrence of a change in which the event pixel 120 becomes dark, i.e., the occurrence of an off event.

The above expression (1) is an example of the representation of the event signal E, and another representation may be used. For example, other numerical values may be assigned to an on event state, an off event state, and an event absence state, or an on event and an off event may be treated as a single type of event signal without distinction.

The event signal E is a signal generated independently of (asynchronously with) a frame synchronization signal used by a normal image sensor. The use of the event signal E enables the detection of an event with a high time resolution. The detected event signal E is sent to the reading unit 102. The reference potential is updated using a reset signal as a trigger, and the output potential of the logarithmic I/V conversion unit 201 when the reset signal is input becomes a new reference potential.

Figure 3:
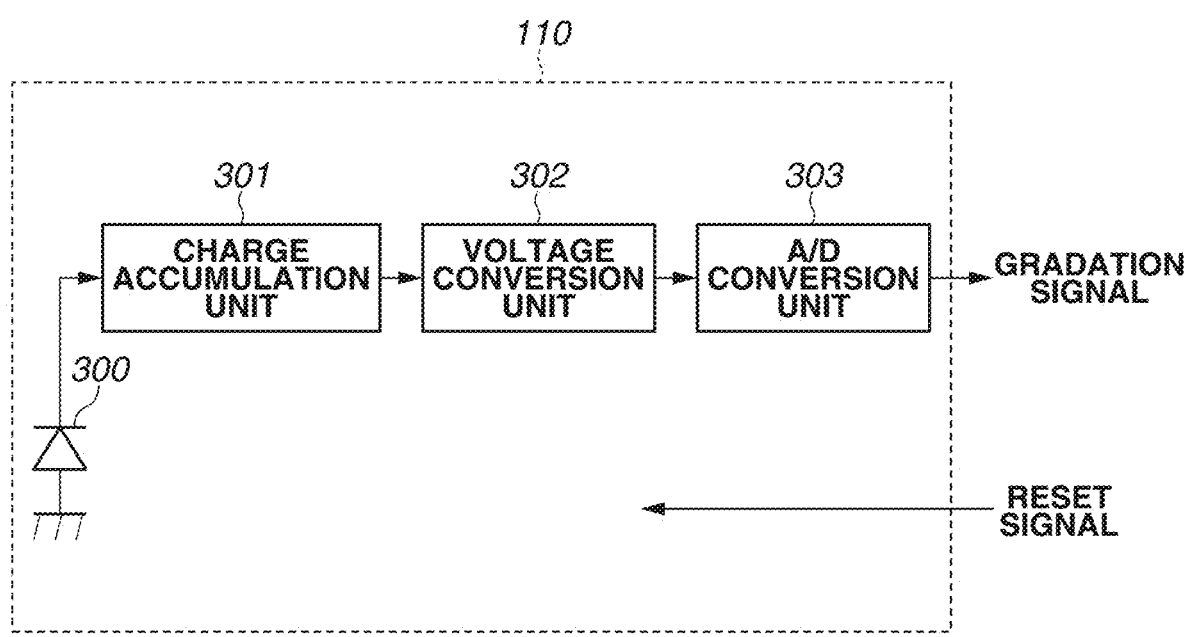
FIG. 3 is a block diagram illustrating the photoelectric conversion apparatus according to the first exemplary embodiment.

FIG. 3 illustrates an example of a block diagram of each of the gradation pixels 110 included in the photoelectric conversion apparatus 100 according to the present exemplary embodiment.

As illustrated in FIG. 3, a single gradation pixel 110 includes a photodiode 300, a charge accumulation unit 301, a voltage conversion unit 302, and an analog-to-digital (A/D) conversion unit 303. The photodiode 300 generates a photocurrent according to the amount of incident light, and charges are accumulated in the charge accumulation unit 301. The voltage conversion unit 302 converts the amount of charge accumulated in a predetermined time in the charge accumulation unit 301 into a voltage and outputs the voltage. The AD conversion unit 303 converts the output potential of the voltage conversion unit 302 into a digital value and outputs the digital value as a gradation signal. Regarding the gradation pixels 110, all the gradation pixels 110 are read at a certain time interval according to a frame synchronization signal, and the time resolution is 16.7 ms (60 fps), for example. The amount of charge of the charge accumulation unit 301 is cleared by a reset signal. Although FIG. 3 illustrates a configuration in which the gradation pixel 110 includes the AD conversion unit 303, the AD conversion unit 303 may be disposed outside the gradation pixel 110. In a case where the AD conversion unit 303 is disposed outside the gradation pixel 110, a configuration may be employed in which, for example, the reading unit 102 includes the AD conversion unit 303, and a plurality of gradation pixels 110 shares a single AD conversion unit 303.

The configurations of the gradation pixel 110 and the event pixel 120 illustrated in the present exemplary embodiment are merely examples. Either one or both of the gradation pixel 110 and the event pixel 120 may be acquired using any other configuration. For example, a configuration may be employed in which a gradation signal is obtained from a photon counter value and an event signal is obtained from the amount of change in the photon counter value, using a photon counting method. For example, a photodiode is an avalanche photodiode that operates in a Geiger mode. A waveform shaping circuit that receives the output of the avalanche photodiode and generates a pulse wave is included, and a counter (a photon counter) that counts the pulse wave is included. An event signal may be obtained using a photon counter value as the value of the counter. The counter may not be used. In this case, an event signal may be generated using the pulse wave of the waveform shaping circuit. In this case, an event signal may be generated using a plurality of pulse waves. For example, in a case where pulse waves are generated multiple times at an interval shorter than a predetermined interval, an event signal indicating that an event occurs may be generated.

Figure 4:
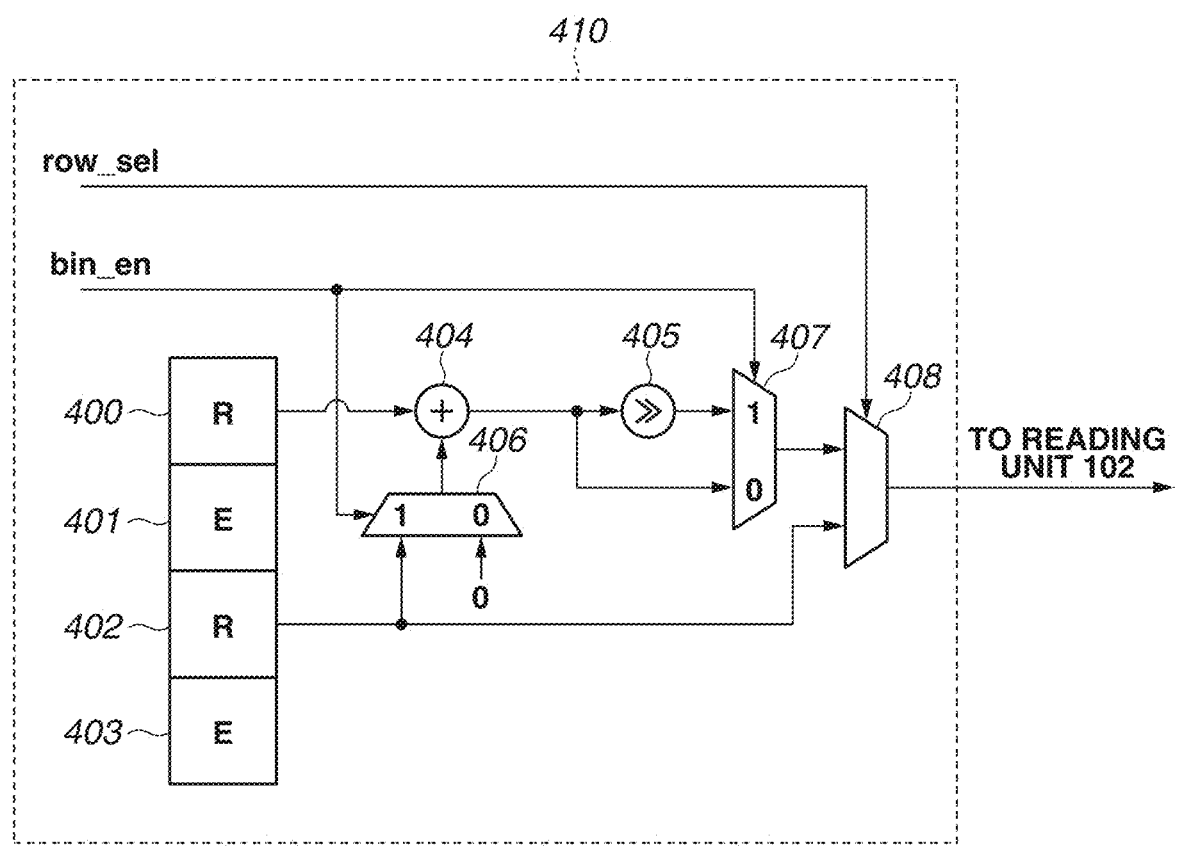
FIG. 4 is a block diagram illustrating the photoelectric conversion apparatus according to the first exemplary embodiment.

FIG. 4 illustrates an example of a block diagram of a binning processing circuit 410 included in the photoelectric conversion apparatus 100 according to the present exemplary embodiment. For example, the binning processing circuit 410 illustrated in FIG. 4 is included in the pixel array unit 101. For ease of description, FIG. 4 illustrates the binning processing circuit 410 in a case where the binning process is performed on two gradation pixels 110 in the vertical direction. The binning processing circuit 410 illustrated in FIG. 4, however, can be extended to a case where the binning process is performed on any number of pixels in any direction. The binning processing circuit 410 illustrated in FIG. 4 can be extended to the binning process on not only the gradation pixels 110 but also the event pixels 120 by changing some of arithmetic circuits included in the binning processing circuit 410.

The binning process is the process of decreasing the space resolution of signals to be output. For example, the binning process is the process of performing an addition averaging process on gradation signals of a plurality of gradation pixels 110 of the same color adjacent to each other in the gradation pixels 110 and putting together the values of the gradation signals into a single value. Consequently, it is possible to decrease the output data rate by decreasing the resolution of the gradation signals. Further, it is also possible to obtain the effect of reducing the influence of noise and improving the signal-to-noise (SN) ratio by adding a plurality of gradation signals. Similarly, the binning process on the event pixels 120 is the process of putting together event signals of a plurality of event pixels 120 adjacent to each other into a single event signal. For example, if at least one on event is detected in a plurality of event pixels 120 adjacent to each other, the event signal E is set to 1. If at least one off event is detected in a plurality of event pixels 120 adjacent to each other, the event signal E is set to −1. If one or more on events and one or more off events are detected, the more detected events are adopted. If the same numbers of on events and off events are detected, priority may be fixedly given to either the on events or the off events. By such a method, it is possible to put together the values of event signals into a single event value. The binning processing method illustrated in this case is merely an example, and any other processing technique can be used so long as the process puts together the outputs of a plurality of pixels into a single output.

As illustrated in FIG. 4, the binning processing circuit 410 includes an addition circuit 404, a bit shifter 405, a selector 406, a selector 407, and a selector 408. A signal bin_en is a signal for switching the presence or absence of the execution of the binning process. If the signal bin_en is at a high level (1), this indicates that the binning is performed on vertical two pixels. If the signal bin_en is at a low level (0), this indicates that the binning is not performed.

For example, the signal bin_en is an output signal from a 1-bit register placed with respect to each region as a binning target in the pixel array unit 101, and the value of the register can be configured to be rewritten by the control unit 103. A signal row_sel is a selection signal of a row from which reading is performed, and is output from the control unit 103 to the binning processing circuit 410. A gradation pixel 400, an event pixel 401, a gradation pixel 402, and an event pixel 403 indicate pixels in four rows in a certain column, and the gradation pixels 400 and 402 receive light through red color filters.

To the selector 406, the signal bin_en and a gradation signal of the gradation pixel 402 are input. Then, the selector 406 selects and outputs the gradation signal of the gradation pixel 402 or the low level (0) according to the input signal bin_en. The addition circuit 404 adds a gradation signal output from the gradation pixel 400 and the output value of the selector 406. Thus, if the signal bin_en is at the low level (0), the output value of the addition circuit 404 is the gradation signal of the gradation pixel 400. If the signal bin_en is at the high level (1), the output value of the addition circuit 404 is a value obtained by adding the gradation signal of the gradation pixel 400 and the gradation signal of the gradation pixel 402. The bit shifter 405 is a circuit that shifts a multi-bit value input from the addition circuit 404 to the right by 1 bit. Consequently, the least significant digit (the first digit) is removed, and bits in the second and higher digits are each shifted to the lower side by 1 bit. Thus, the bit shifter 405 performs a process equivalent to the calculation of dividing the input value by 2 (and rounding down the remainder) and outputs a signal obtained by dividing the input value of the addition circuit 404 by 2. To the selector 407, the output value of the addition circuit 404 and the output value of the bit shifter 405 are input. Then, the selector 407 selects and outputs the output value of the addition circuit 404 or the output value of the bit shifter 405 according to the input signal bin_en. If the signal bin_en is at the low level (0), the selector 407 outputs the output value of the addition circuit 404. If the signal bin_en is at the high level (1), the selector 407 selects and outputs the output value of the bit shifter 405. Thus, if the signal bin_en is at the low level (0), the selector 407 outputs the gradation signal of the gradation pixel 400. If the signal bin_en is at the high level (1), the selector 407 outputs the average value (the binning value) of the gradation signal of the gradation pixel 400 and the gradation signal of the gradation pixel 402. The selector 408 selects a row according to the input signal row_sel and outputs gradation signals corresponding to gradation pixels disposed in the selected row to the reading unit 102.

Regarding the reading of gradation pixels described in FIG. 4, if the signal bin_en is at the low level (0), it is possible to acquire the gradation signal of the gradation pixel 400 and the gradation signal of the gradation pixel 402 by switching the signal row_sel and sequentially reading the first and third rows. If, on the other hand, the signal bin_en is at the high level (1), it is possible to acquire only the binning value of the gradation signals corresponding to the gradation pixels 400 and 402 by reading the first row, and not read the third row. In this manner, when the binning process is performed, it is possible to decrease the output data rate by reducing the number of times gradation signals are read.

In the above description, the output data rate of corresponding signals is decreased by performing the binning process in the pixel array unit 101 and reducing the number of times of reading from the pixel array unit 101 to the reading unit 102. However, the output data rate of corresponding signals may be decreased by the reading unit 102 holding signals of a plurality of rows sequentially read from the pixel array unit 101 and by performing the binning process in the reading unit 102. That is, the output data rate of gradation signals may be decreased by decreasing the number of gradation signals to be output from the reading unit 102 compared to the number of gradation signals to be input to the reading unit 102 in a predetermined length of time. FIG. 4 illustrates a case where the binning process is performed on digital signals output from the gradation pixels 400 and 402. However, in a case where AD conversion is performed outside pixels, the binning process may be performed on an analog signal using a binning processing circuit that processes an analog signal. These binning processes are not limited to gradation signals, and similar processes can also be performed on event signals.

Figures 5A, 5B:
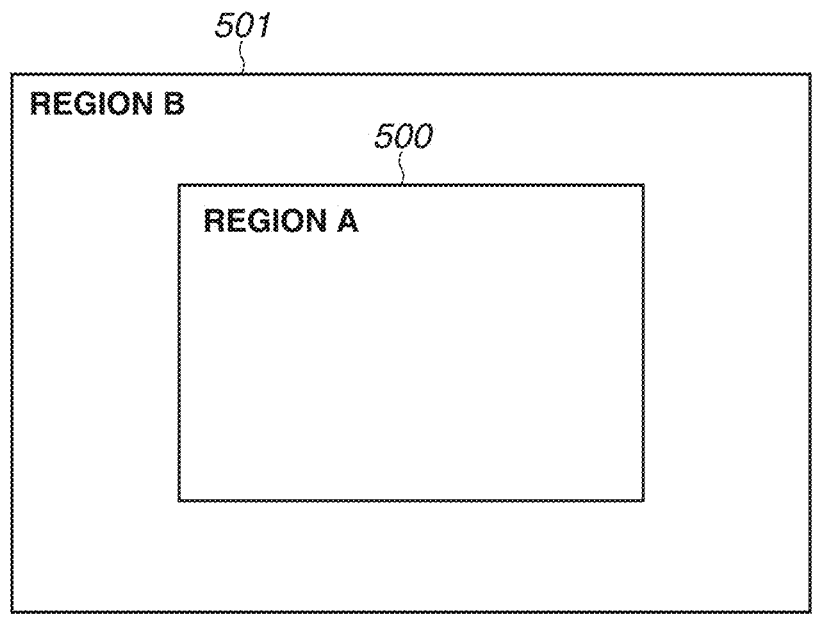
FIGS. 5A and 5B are diagrams illustrating control of output data rates of the photoelectric conversion apparatus according to the first exemplary embodiment.

FIGS. 5A and 5B are examples of diagrams illustrating control of the output data rates of signals to be output from the photoelectric conversion apparatus 100 according to the present exemplary embodiment.

FIGS. 5A and 5B illustrate examples of the settings of the binning processing methods and the reading cycles of the gradation pixels 110 and the event pixels 120 and divided pixel regions that are controlled by the control unit 103.

FIG. 5A illustrates two pixel regions obtained by dividing the pixel array unit 101. A region A 500 is a central pixel region set near the center of the pixel array unit 101, and a region B 501 is a peripheral pixel region set outside the central pixel region in the pixel array unit 101.

FIG. 5B illustrates an example where the control patterns of the output data rates of the gradation pixels 110 and the event pixels 120 are set with respect to each operation mode and each pixel region. As specific setting types corresponding to the output data rates, examples of the settings of the binning process and the reading cycle are illustrated. For example, a case is described where the photoelectric conversion apparatus 100 is used in an in-vehicle camera, and a normal mode and a running-out detection mode are switched. The running-out detection mode is an example of a setting assuming an application that detects the running out of a person or another vehicle from the side with low latency and controls an automatic brake of a driver's vehicle. A mode other than the normal mode and the running-out detection mode may be able to be used, and three or more modes may be able to be switched.

In the normal mode, the same settings are made for the region A 500 and the region B 501. Specifically, for the gradation pixels 110 corresponding to both pixel regions, "binning process" is "absent" and "reading cycle" is "16.7 ms". For the event pixels 120 corresponding to both pixel regions, "binning process" is "absent" and "reading cycle" is "1.0 ms".

In the running-out detection mode, however, the settings of the region A 500 do not change, but the settings of the region B 501 are different from those of the region B 501 in the normal mode. In the running-out detection mode, for the gradation pixels 110 disposed in the region B 501, "binning process" is "present (2×2)". For example, the binning process for 2×2 is the process of performing an addition averaging process on signals corresponding to two pixels in the horizontal direction and two pixels in the vertical direction, i.e., a total of four pixels, of the same color, thereby setting the number of output signals to ¼ times that in the normal mode where "binning process" is "absent". That is, in the running-out detection mode, the output data rate of gradation signals to be output from the gradation pixels 110 disposed in the region B 501 is decreased by decreasing the space resolution compared to the normal mode. In the running-out detection mode, for the event pixels 120 disposed in the region B 501, "reading cycle" is "0.5 ms".

The reading cycle is set to 0.5 ms, whereby the reading cycle is ½ times that in the normal mode where "reading cycle" is "1.0 ms". That is, in the running-out detection mode, the output data rate of event signals to be output from the event pixels 120 disposed in the region B 501 is increased by increasing the time resolution compared to the normal mode.

As described above, a part of the output data rate assigned to gradation signals in the region B 501 as the peripheral pixel region is assigned to the output data rate of event signals, thereby increasing the time resolution of the event signals. By such control, for example, it is possible to detect an imaging target object entering an imaging range from outside, i.e., a person or another vehicle running out from the side, fast and increase the response speed of an automatic brake of a driver's vehicle.

In the present exemplary embodiment, the settings of the region B 501 are different from those of the region B 501 in the normal mode according to the set mode. That is, a first pattern for outputting gradation signals and event signals at first and second output data rates, respectively, and a second pattern for outputting gradation signals and event signals at third and fourth output data rates, respectively, are switched according to the set mode. In other words, in the normal mode, the same settings are made for the region A 500 and the region B 501, whereas in the running-out detection mode, the settings of the region B 501 change from the normal mode. Thus, in the running-out detection mode, different settings are made for the region A 500 and the region B 501. That is, the first pattern for outputting the gradation signals and the event signals at the first and second output data rates, respectively, and the second pattern for outputting the gradation signals and the event signals at the third and fourth output data rates, respectively, are switched according to the divided pixel regions. In this case, it can be considered that one pixel region of the plurality of divided pixel regions is set to the first pattern, and the other pixel region is set to the second pattern. The first and third output data rates are different from each other, and the second and fourth output data rates are different from each other. If the first output data rate is greater than the third output data rate, the second output data rate may be smaller than the fourth output data rate. If the first output data rate is smaller than the third output data rate, the second output data rate may be greater than the fourth output data rate.

As described above, according to the present exemplary embodiment, the output data rates of gradation signals and event signals are changed to different values according to the patterns, whereby it is possible to perform optimal control when the gradation signals and the event signals are output. Since both gradation signals and event signals can be acquired in the present exemplary embodiment, it is possible to acquire more information than a photoelectric conversion apparatus capable of acquiring only gradation signals or only event signals. The above patterns are switched with respect to each set mode and each divided pixel region according to the purpose or the scene, whereby it is possible to optimize control of the output of gradation signals and event signals according to the purpose or the scene.

In a case where gradation signals and event signals are output to outside the photoelectric conversion apparatus 100 using the same output unit, and if the signal amount of signals to be output exceeds the maximum output data amount of the output unit, some of the signals to be output may be missing. According to the patterns to be switched, at least one of the output data rate of the gradation signals and the output data rate of the event signals is decreased, and at least one of the output data rate of the gradation signals and the output data rate of the event signals is increased. By performing such control, it is possible to appropriately allocate the output data rate of the gradation signals and the output data rate of the event signals within the maximum output data amount of the output unit. For example, in a case where the event signals are more necessary than the gradation signals, the output data rate of the gradation signals is decreased, and the output data rate of the event signals is increased, whereby it is possible to appropriately control the output data rates. Similarly, in a case where gradation signals and event signals are read using the same reading unit 102, and if the signal amount of signals to be read exceeds the maximum reading data amount of the reading unit 102, some of the signals to be read may be missing. According to the patterns to be switched, at least one of the output data rate of the gradation signals and the output data rate of the event signals is decreased, and at least one of the output data rate of the gradation signals and the output data rate of the event signals is increased. By performing such control, it is possible to appropriately allocate the output data rate of the gradation signals and the output data rate of the event signals within the maximum reading data amount of the reading unit 102. For example, in a case where the event signals are more necessary than the gradation signals, the output data rate of the gradation signals is decreased, and the output data rate of the event signals is increased, whereby it is possible to appropriately control the output data rates.

The numerical values used in the configurations and the processing methods illustrated in the present exemplary embodiment are merely examples, and do not limit the exemplary embodiment. The ranges of the binning process to be performed on the gradation pixels 110 and the event pixels 120 and the reading cycles of the gradation pixels 110 and the event pixels 120 can take any values. Also, regarding the setting of the pixel region, the method for dividing the pixel region illustrated in FIG. 5A is merely an example, and does not limit the positions, the areas, and the shapes of the region A 500 and the region B 501. Although the pixel region is divided into two pixel regions in the present exemplary embodiment, a configuration can also be employed in which the pixel regions are divided into more pixel regions so that different binning processing methods and reading cycles can be set for the pixel regions. Although in the example illustrated in FIGS. 5A and 5B, the binning process is absent for the event pixels 120 in the running-out detection mode, an example where the binning process is present is also possible. For example, the space resolution is decreased by setting "binning process" to "present (2×2)" for the event pixels 120 in the region B 501. Thus, it is also possible to increase the time resolution by further shortening the reading cycle of the event pixels 120 in the region B 501 by the amount of the decrease. The sizes of binning target regions for the gradation pixels 110 and the event pixels 120 may be different from each other. For example, the sizes of the binning target regions may be optionally set by setting "binning process" to "present (4×4)" for the gradation pixels 110 and setting "binning process" to "present (2×2)" for the event pixels 120.

Further, although the event pixels 120 are read in a constant cycle in the description of the present exemplary embodiment, a configuration may be employed in which, according to the timing of the occurrence of an event, only event signals corresponding to a pixel region where an event occurs are asynchronously output. In this case, for example, the reading frequency is adjusted by providing the minimum reading interval for the time interval at which the event signals are read. Thus, it is possible to adjust the time resolution with which the event signals are output. The output data rate of the event signals in this case can also be considered as the maximum data rate at which the event signals can be output. In this case, the control unit 103 may include an arbitration circuit. The arbitration circuit sequentially selects event pixels 120 in which events are detected among the plurality of event pixels 120. Consequently, event signals are sequentially read from the plurality of event pixels 120 by the reading unit 102. That is, the arbitration circuit is a circuit that performs control to arbitrate the order of reading from a plurality of event pixels 120 in which events are detected.

Further, although gradation signals and event signals are generated based on incident light in the present exemplary embodiment, another example is also possible. For example, the combination of gradation pixels that output gradation signals to acquire distance information regarding the distance to an imaging target as in a distance image acquisition sensor, and event pixels that output event signals to acquire a change in the distance information may be used. As described above, with the combination of gradation pixels that output gradation signals corresponding to input values and event pixels that output event signals corresponding to changes in the input values, an effect similar to that of the present exemplary embodiment is obtained by applying the disclosure.

Figure 6:
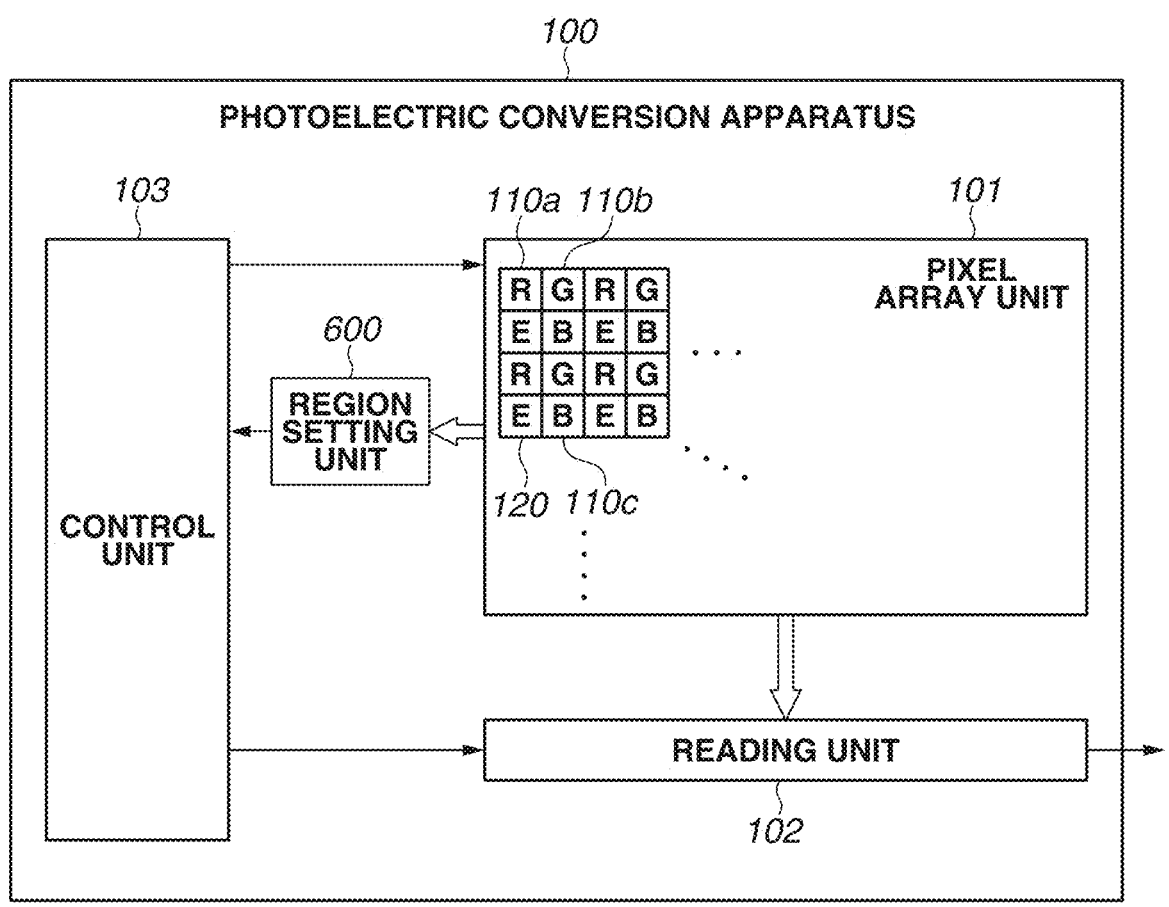
FIG. 6 is a block diagram illustrating a photoelectric conversion apparatus according to a second exemplary embodiment.
Figures 7A, 7B:
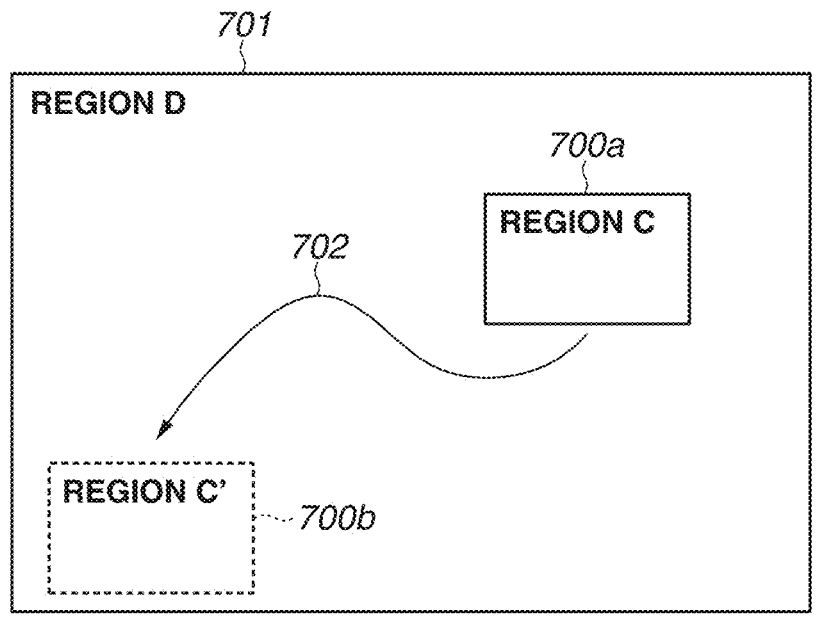
FIGS. 7A and 7B are diagrams illustrating control of output data rates of the photoelectric conversion apparatus according to the second exemplary embodiment.

With reference to FIGS. 6, 7A, and 7B, a photoelectric conversion apparatus 100 according to a second exemplary embodiment of the disclosure is described. Components similar to those in the first exemplary embodiment are designated by the same signs, and the description of these components is occasionally omitted or simplified.

The present exemplary embodiment is different from the first exemplary embodiment in a configuration in which the photoelectric conversion apparatus 100 further includes a region setting unit that sets a plurality of pixel regions into which the pixel array unit 101 is to be divided.

FIG. 6 illustrates an example of a block diagram of the photoelectric conversion apparatus 100 according to the present exemplary embodiment.

As illustrated in FIG. 6, the photoelectric conversion apparatus 100 further includes a region setting unit 600. For example, based on signals input from the pixel array unit 101, the region setting unit 600 sets a plurality of pixel regions into which the pixel array unit 101 is to be divided. Then, the region setting unit 600 outputs setting signals for the plurality of pixel regions to the control unit 103. Based on the signals output from the region setting unit 600, the control unit 103 controls at least one of the pixel array unit 101 and the reading unit 102 so that the output data rate differs with respect to each pixel region. The output data rate of each of the divided pixel regions may be calculated by the region setting unit 600, or may be calculated by the control unit 103, or may be calculated outside the photoelectric conversion apparatus 100, or may be incorporated as a design value into the photoelectric conversion apparatus 100 in advance. For example, the output data rate of each of the divided pixel regions is controlled by changing the binning processing methods and the reading cycles. Gradation signals and event signals used only by the region setting unit 600 do not necessarily need to be output to the reading unit 102 and outside the photoelectric conversion apparatus 100.

For example, the region setting unit 600 may include a spiking neural network (SNN) to which the output value of each event pixel 120 in the pixel array unit 101 is input. The SNN is a neural network that performs processing using chronological spike information as an input, and the occurrence of an event in the event pixel 120 can be input as spike information to the SNN. For example, a circuit included in the SNN is placed in a layer below the layer of the pixel array unit 101 by a semiconductor lamination technique. The region setting unit 600 including the SNN obtains a region having a high degree of importance in an imaging range and inputs information indicating the position or the range of the region as a parameter to the control unit 103. To the SNN, gradation signals may be input, or both gradation signals and event signals may be input. The SNN, however, uses spike information as in event signals as input data. Thus, a configuration may be employed in which in a case where gradation signals are input to the SNN, gradation signals output from the reading unit 102 are first saved in a memory (not illustrated) in the photoelectric conversion apparatus 100.

Then, the gradation signals are converted into spike information, and the converted gradation signals are input to the SNN.

Although the region setting unit 600 includes the SNN, this does not limit the configuration. For example, the region setting unit 600 may include another configuration such as a convolutional neural network (CNN). To the CNN, gradation signals may be input, or event signals may be input, or both gradation signals and event signals may be input. The CNN, however, uses input data having an array structure as in frame image data (gradation signals) output from a conventional image sensor, as input data. Thus, a configuration may be employed in which in a case where event signals are input to the CNN, and if event signals corresponding to a region where an event does not occur are not output, event signals output from the reading unit 102 are first saved in a memory (not illustrated) in the photoelectric conversion apparatus 100. Then, the event signals are converted into an array structure, and the converted event signals are input to the CNN. As an example where an event column is converted into an array structure, there is a two-dimensional (2D) histogram format where a value corresponding to the pixel value of output image data of a general image sensor is set as the number of events that occur in the pixel in a certain period. There is also a time surface format where a value corresponding to the pixel value of output image data of a general image sensor is set as the latest timestamp among events that occur in pixels.

These are merely examples, and the method for converting an event column into data having an array structure may be any method. In a case where the CNN is used, not event signals but a setting value stored in a memory (not illustrated) in the photoelectric conversion apparatus 100 may be input as an input.

FIGS. 7A and 7B are examples of diagrams illustrating control of the output data rates of signals to be output from the photoelectric conversion apparatus 100 according to the present exemplary embodiment.

FIGS. 7A and 7B illustrate examples of the settings of the binning processing methods and the reading cycles of the gradation pixels 110 and the event pixels 120 and divided pixel regions that are controlled by the control unit 103.

FIG. 7A illustrates pixel regions divided based on the setting result of the region setting unit 600. A region C 700a and a region C' 700b indicate an important region set by the region setting unit 600, and the important region moves along the direction of an arrow 702 with the lapse of time. The region C 700a indicates the state before the important region moves, and the region C' 700b indicates the state after the important region moves. A region D 701 is a region different from the important region. The region setting unit 600 sequentially executes the process of obtaining the important region and updates signals to be output to the control unit 103 while the region C 700a moves to the region C' 700b. In a case where the region C 700a is set as the important region, a region equivalent to the region C' 700b is included in the region D 701. In a case where the region C' 700b is set as the important region, a region equivalent to the region C 700a is included in the region D 701.

A signal used to detect the arrow 702 for moving the important region may be an event signal, or may be a gradation signal, or may be both an event signal and a gradation signal. For example, it is possible to move the important region faster by using an event signal of which the reading cycle is shorter than that of a gradation signal.

FIG. 7B illustrates an example where the control patterns of the output data rates of the gradation pixels 110 and the event pixels 120 are set with respect to each operation mode and each pixel region. As specific setting types corresponding to the output data rates, examples of the settings of the binning process and the reading cycle are illustrated. For example, a case is described where the photoelectric conversion apparatus 100 is applied to a network camera that captures an area where products are displayed in a shop. A normal mode is used for the purpose of collecting marketing information, such as tracking the traffic line of a customer. For example, a dynamic body tracking mode is an example of a setting assuming that the important region is moved according to the movement of a suspicious person as a dynamic body, whereby images (gradation signals) of the suspicious person and the periphery of the suspicious person are continuously acquired with a high time resolution. A mode other than the normal mode and the dynamic body tracking mode may be able to be used, and three or more modes may be able to be switched. In the normal mode, the same settings are made for the important region and the region D 701. Specifically, for the gradation pixels 110 corresponding to both pixel regions, "binning process" is "absent" and "reading cycle" is "100.0 ms". For the event pixels 120 corresponding to both pixel regions, "binning process" is "absent" and "reading cycle" is "1.0 ms".

In the dynamic body tracking mode, however, the settings of the important region are different from those of the important region in the normal mode. In the dynamic body tracking mode, the settings of the region D 700 are different from those of the important region in the normal mode and the important region in the dynamic body tracking mode. In other words, in the normal mode, the same settings are made for the important region and the region D 701, whereas in the dynamic body tracking mode, different settings are made for the important region and the region D 701.

In the dynamic body tracking mode, the event pixels 120 disposed in the important region and the gradation pixel 110 disposed in the region D 701 do not output signals. In the dynamic body tracking mode, for the gradation pixels 110 disposed in the important region, "reading cycle" is "25.0 ms". The reading cycle is set to 25.0 ms, whereby the reading cycle is ¼ times that in the normal mode where "reading cycle" is "100.0 ms". That is, in the dynamic body tracking mode, the output data rate of gradation signals to be output from the gradation pixels 110 disposed in the important region is increased by increasing the time resolution compared to the normal mode. In the dynamic body tracking mode, for the event pixels 120 disposed in the region D 701, "reading cycle" is "2.0 ms". The reading cycle is set to 2.0 ms, whereby the reading cycle is twice that in the normal mode where "reading cycle" is "1.0 ms". That is, in the dynamic body tracking mode, the output data rate of event signals to be output from the event pixels 120 disposed in the region D 701 is decreased by decreasing the time resolution compared to the normal mode. Thus, in the dynamic body tracking mode, the output data rates of event signals in the important region and gradation signals and event signals in the region D 701 are decreased and the output data rate of gradation signals in the important region is increased compared to the normal mode.

As described above, a part of the output data rates assigned to event signals in the important region and gradation signals and event signals in the region D 701 is assigned to gradation signals in the important region, thereby controlling the output data rates. By such control, in the dynamic body tracking mode, it is possible to increase the accuracy of distinguishing the face of a suspicious person and perform a detailed analysis of the behavior of the suspicious person by attaching importance to pixel data corresponding to gradation signals in the important region. On the other hand, it is also possible to acquire a certain degree of information regarding a region (the region D 701) other than the periphery of the suspicious person from event signals.

In the present exemplary embodiment, the settings of the important region are different from those of the important region in the normal mode, and the settings of the region D 701 are different from those of the region D 701 in the normal mode according to the set mode. That is, a first pattern for outputting gradation signals and event signals at first and second output data rates, respectively, and a second pattern for outputting gradation signals and event signals at third and fourth output data rates, respectively, are switched according to the set mode. In the dynamic body tracking mode, different settings are made for the important region and the region D 701. That is, the first pattern for outputting gradation signals and event signals at the first and second output data rates, respectively, and the second pattern for outputting gradation signals and event signals at the third and fourth output data rates, respectively, are switched according to the divided pixel regions. In this case, it can be considered that one pixel region of the plurality of divided pixel regions is set to the first pattern, and the other pixel region is set to the second pattern. The first and third output data rates are different from each other, and the second and fourth output data rates are different from each other. If the first output data rate is greater than the third output data rate, the second output data rate may be smaller than the fourth output data rate. If the first output data rate is smaller than the third output data rate, the second output data rate may be greater than the fourth output data rate.

As described above, according to the present exemplary embodiment, the output data rates of gradation signals and event signals are changed to different values according to the patterns, whereby it is possible to perform optimal control when the gradation signals and the event signals are output. Since both gradation signals and event signals can be acquired in the present exemplary embodiment, it is possible to acquire more information than a photoelectric conversion apparatus capable of acquiring only gradation signals or only event signals. The above patterns are switched with respect to each set mode and each divided pixel region according to the purpose or the scene, whereby it is possible to optimize control of the output of gradation signals and event signals according to the purpose or the scene.

In a case where gradation signals and event signals are output to outside the photoelectric conversion apparatus 100 using the same output unit, and if the signal amount of signals to be output exceeds the maximum output data amount of the output unit, some of the signals to be output may be missing. According to the patterns to be switched, at least one of the output data rate of the gradation signals and the output data rate of the event signals is decreased, and at least one of the output data rate of the gradation signals and the output data rate of the event signals is increased. By performing such control, it is possible to appropriately allocate the output data rate of the gradation signals and the output data rate of the event signals within the maximum output data amount of the output unit. For example, in a case where the event signals are more necessary than the gradation signals, the output data rate of the gradation signals is decreased, and the output data rate of the event signals is increased, whereby it is possible to appropriately control the output data rates. Similarly, in a case where gradation signals and event signals are read using the same reading unit 102, and if the signal amount of signals to be read exceeds the maximum reading data amount of the reading unit 102, some of the signals to be read may be missing. According to the patterns to be switched, at least one of the output data rate of the gradation signals and the output data rate of the event signals is decreased, and at least one of the output data rate of the gradation signals and the output data rate of the event signals is increased. By performing such control, it is possible to appropriately allocate the output data rate of the gradation signals and the output data rate of the event signals within the maximum reading data amount of the reading unit 102. For example, in a case where the event signals are more necessary than the gradation signals, the output data rate of the gradation signals is decreased, and the output data rate of the event signals is increased, whereby it is possible to appropriately control the output data rates.

The numerical values used in the configurations and the processing methods illustrated in the present exemplary embodiment are merely examples, and do not limit the exemplary embodiment. The ranges of the binning process to be performed on the gradation pixels 110 and the event pixels 120 and the reading cycles of the gradation pixels 110 and the event pixels 120 can take any values. Also, regarding the setting of the pixel region, the method for dividing the pixel region illustrated in FIG. 7A is merely an example, and does not limit the positions, the areas, and the shapes of the important region and the region D 701. The important region set by the region setting unit 600 is a single region that changes from the region C 700a to the region C' 700b, but may be a plurality of regions. Further, the region setting unit 600 may set a degree of importance for each of the plurality of important regions. In this case, the region setting unit 600 may set a different binning processing method or reading cycle with respect to each important region so that the higher the degree of importance of the important region is, the higher the corresponding output data rate is. Although in the example illustrated in FIGS. 7A and 7B, the binning process is absent for the event pixels 120 disposed in the region D 701 in the dynamic body tracking mode, an example where the binning process is present is also possible. For example, the space resolution is decreased by setting "binning process" to "present (2×2)" for the event pixels 120 in the region D 701. Thus, it is also possible to increase the time resolution by further shortening the reading cycle of the gradation pixels 110 in the important region by the amount of the decrease. The sizes of binning target regions for the gradation pixels 110 and the event pixels 120 may be different from each other. For example, the sizes of the binning target regions may be optionally set by setting "binning process" to "present (4×4)" for the event pixels 120 and setting "binning process" to "present (2×2)" for the gradation pixels 110.

Further, although the event pixels 120 are read in a constant cycle in the description of the present exemplary embodiment, a configuration may be employed in which, according to the timing of the occurrence of an event, only event signals corresponding to a pixel region where an event occurs are asynchronously output. In this case, for example, the reading frequency is adjusted by providing the minimum reading interval for the time interval at which the event signals are read. Thus, it is possible to adjust the time resolution with which the event signals are output. The output data rate of the event signals in this case can also be considered as the maximum data rate at which the event signals can be output. In this case, the control unit 103 may include an arbitration circuit. The arbitration circuit sequentially selects event pixels 120 in which events are detected among the plurality of event pixels 120. Consequently, event signals are sequentially read from the plurality of event pixels 120 by the reading unit 102. That is, the arbitration circuit is a circuit that performs control to arbitrate the order of reading from a plurality of event pixels 120 in which events are detected.

Further, although gradation signals and event signals are generated based on incident light in the present exemplary embodiment, another example is also possible. For example, the combination of gradation pixels that output gradation signals for acquiring distance information regarding the distance to an imaging target as in a distance image acquisition sensor, and event pixels that output event signals for acquiring a change in the distance information may be used. As described above, with the combination of gradation pixels that output gradation signals corresponding to input values and event pixels that output event signals corresponding to changes in the input values, an effect similar to that of the present exemplary embodiment is obtained by applying the disclosure.

Figure 8A:
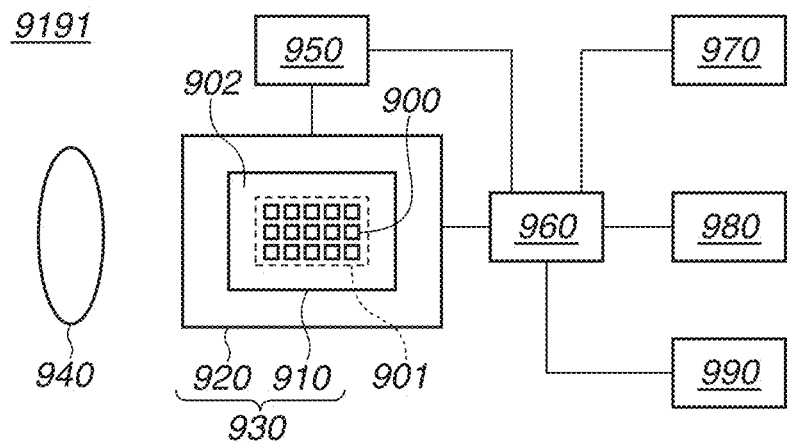
FIGS. 8A, 8B, and 8C are schematic diagrams illustrating a device according to a third exemplary embodiment.

A third exemplary embodiment is also applicable to the first or second exemplary embodiment. FIG. 8A is a schematic diagram illustrating a device 9191 including a semiconductor apparatus 930 according to the present exemplary embodiment. As the semiconductor apparatus 930, the photoelectric conversion apparatus 100 according to each of the above exemplary embodiments can be used. The device 9191 including the semiconductor apparatus 930 is described in detail. The semiconductor apparatus 930 can include a semiconductor device 910. The semiconductor apparatus 930 can include a semiconductor device 910 and a package 920 for accommodating the semiconductor device 910. The package 920 can include a base to which the semiconductor device 910 is fixed, and a cover body, such as glass, opposed to the semiconductor device 910. The package 920 can further include a joint member, such as a bonding wire or a bump, connecting a terminal provided in the base and a terminal provided in the semiconductor device 910.

The device 9191 can include at least any of an optical apparatus 940, a control apparatus 950, a processing apparatus 960, a display apparatus 970, a storage apparatus 980, and a machine apparatus 990. The optical apparatus 940 is compatible with the semiconductor apparatus 930. For example, the optical apparatus 940 is a lens, a shutter, and a mirror and includes an optical system that guides light to the semiconductor apparatus 930. The control apparatus 950 controls the semiconductor apparatus 930. The control apparatus 950 is a semiconductor apparatus such as an application-specific integrated circuit (ASIC).

The processing apparatus 960 processes a signal output from the semiconductor apparatus 930. The processing apparatus 960 is a semiconductor apparatus such as a central processing unit (CPU) or an ASIC for configuring an analog front end (AFE) or a digital front end (DFE). The display apparatus 970 is an electroluminescent (EL) display apparatus or a liquid crystal display apparatus that displays information (an image) obtained by the semiconductor apparatus 930. The storage apparatus 980 is a magnetic device or a semiconductor device that stores information (an image) obtained by the semiconductor apparatus 930. The storage apparatus 980 is a volatile memory such as a static random-access memory (SRAM) or a dynamic random-access memory (DRAM), or a non-volatile memory such as a flash memory or a hard disk drive.

The machine apparatus 990 includes a movable portion or a propulsive portion such as a motor or an engine. The device 9191 displays a signal output from the semiconductor apparatus 930 on the display apparatus 970, or transmits a signal output from the semiconductor apparatus 930 to outside, using a communication apparatus (not illustrated) included in the device 9191. To this end, the device 9191 should further include the storage apparatus 980 and the processing apparatus 960 separately from a storage circuit and an arithmetic circuit included in the semiconductor apparatus 930. The machine apparatus 990 may be controlled based on a signal output from the semiconductor apparatus 930.

The device 9191 is suitable for an electronic device such as an information terminal having an imaging function (e.g., a smartphone or a wearable terminal) or a camera (e.g., an interchangeable lens camera, a compact camera, a video camera, or a monitoring camera). The machine apparatus 990 in the camera can drive the components of the optical apparatus 940 for a zooming operation, a focusing operation, and a shutter operation. Alternatively, the machine apparatus 990 in the camera can move the semiconductor apparatus 930 for an image stabilization operation.

The device 9191 can also be a transportation device such as a vehicle, a vessel, or a flying object (a drone or an aircraft). The machine apparatus 990 in the transportation device can be used as a moving device. The device 9191 as the transportation device is suitable for a transportation device that transports the semiconductor apparatus 930, or a transportation device that assists and/or automates driving (maneuvering) by an imaging function. The processing apparatus 960 for assisting and/or automating driving (maneuvering) can perform processing for operating the machine apparatus 990 as the moving device based on information obtained by the semiconductor apparatus 930. Alternatively, the device 9191 may be a medical device such as an endoscope, a measurement device such as a distance measurement sensor, an analysis device such as an electron microscope, an office device such as a copying machine, or an industrial device such as a robot.

According to the above exemplary embodiments, it is possible to obtain excellent pixel characteristics. Thus, it is possible to increase the value of a semiconductor apparatus. The increase in the value corresponds to at least any of the addition of a function, an improvement in the performance, improvements in the characteristics, an improvement in the reliability, an improvement in the manufacturing yield, a reduction in the environmental load, a reduction in the cost, a reduction in the size, and a reduction in the weight.

Thus, if the semiconductor apparatus 930 according to the present exemplary embodiment is used for the device 9191, it is also possible to improve the value of the device 9191. For example, when the semiconductor apparatus 930 is mounted on a transportation device, and an image outside the transportation device is captured, or the external environment is measured, it is possible to obtain excellent performance. Thus, in a case where a transportation device is manufactured and sold, the determination of the mounting of the semiconductor apparatus 930 according to the present exemplary embodiment on the transportation device is beneficial in enhancing the performance of the transportation device itself. Particularly, the semiconductor apparatus 930 is suitable for a transportation device that performs driving assistance and/or automatic driving of the transportation device using information obtained by a semiconductor apparatus.

Figure 8B:
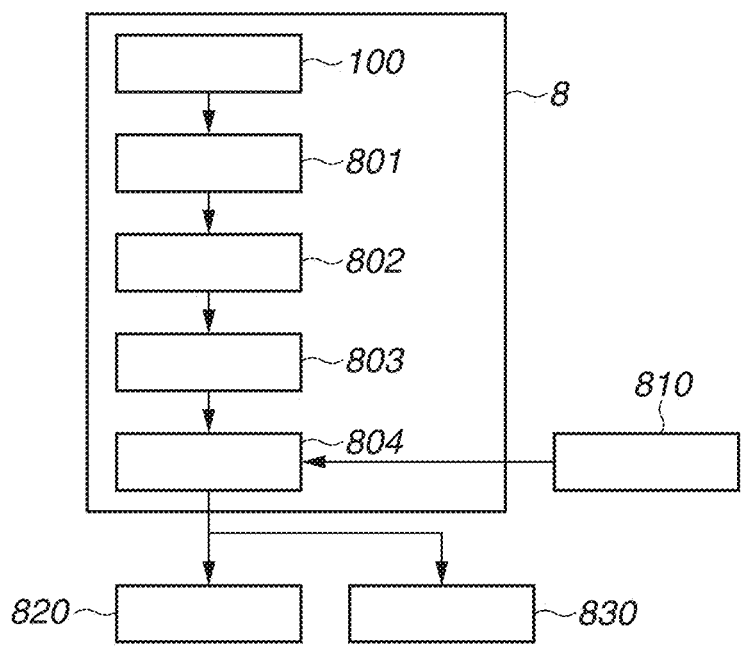
Figure 8C:
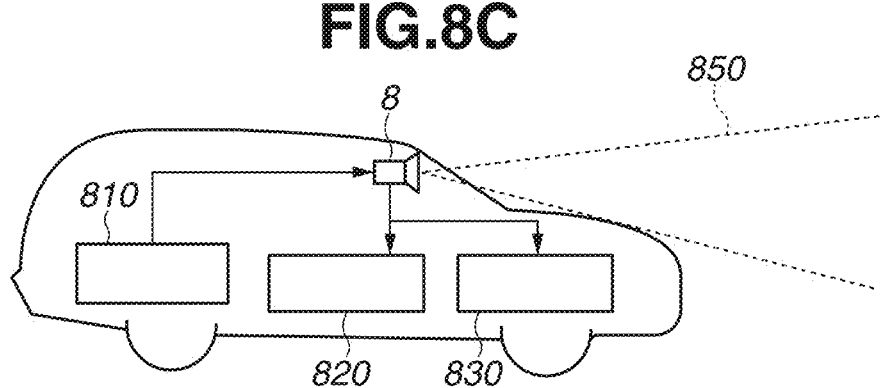

With reference to FIGS. 8B and 8C, a photoelectric conversion system and a moving body according to the present exemplary embodiment are described.

FIG. 8B illustrates an example of a photoelectric conversion system regarding an in-vehicle camera. A photoelectric conversion system 8 includes a photoelectric conversion apparatus 100. The photoelectric conversion apparatus 100 is the photoelectric conversion apparatus (an imaging apparatus) according to any of the above exemplary embodiments. The photoelectric conversion system 8 includes an image processing unit 801 that performs image processing on a plurality of pieces of image data acquired by the photoelectric conversion apparatus 100, and a parallax acquisition unit 802 that calculates a parallax (the phase difference between parallax images) from the plurality of pieces of image data acquired by the photoelectric conversion system 8. The photoelectric conversion system 8 may include an optical system (not illustrated) that guides light to the photoelectric conversion apparatus 100, such as a lens, a shutter, and a mirror. In each of the pixels included in the photoelectric conversion apparatus 100, a plurality of photoelectric conversion units almost conjugate to the pupil of the optical system may be disposed. For example, the plurality of photoelectric conversion units almost conjugate to the pupil may be disposed corresponding to a single microlens. The plurality of photoelectric conversion units may receive beams passing through positions different from each other in the pupil of the optical system, whereby the photoelectric conversion apparatus 100 may output pieces of image data corresponding to the beams passing through the different positions. Then, the parallax acquisition unit 802 may calculate a parallax using the output pieces of image data. The photoelectric conversion system 8 also includes a distance acquisition unit 803 that calculates the distance to a target object based on the calculated parallax, and a collision determination unit 804 that, based on the calculated distance, determines whether there is a possibility of a collision. The parallax acquisition unit 802 and the distance acquisition unit 803 are examples of a distance information acquisition unit that acquires distance information regarding the distance to a target object. That is, the distance information is information regarding the parallax, the amount of defocus, and the distance to the target object. Using any of these pieces of distance information, the collision determination unit 804 may determine the possibility of a collision. The distance information may be acquired using time of flight (ToF). The distance information acquisition unit may be achieved by exclusively designed hardware, or may be achieved by a software module. Alternatively, the distance information acquisition unit may be achieved by a field-programmable gate array (FPGA) or an ASIC, or may be achieved by the combination of these.

The photoelectric conversion system 8 is connected to a vehicle information acquisition apparatus 810 and can acquire vehicle information such as the speed of a vehicle, the yaw rate, and the steering angle. The photoelectric conversion system 8 is also connected to a control electronic control unit (ECU) 820 that is a control apparatus that outputs a control signal to produce a braking force in the vehicle based on the determination result of the collision determination unit 804. The photoelectric conversion system 8 is also connected to an alarm apparatus 830 that gives an alarm to a driver based on the determination result of the collision determination unit 804. For example, if there is a high possibility of a collision as the determination result of the collision determination unit 804, the control ECU 820 applies a brake, returns the gas pedal, or suppresses the engine output, thereby controlling the vehicle to avoid a collision and reduce damage. The alarm apparatus 830 warns a user by setting off an alarm such as a sound, displaying alarm information on a screen of an automotive navigation system, or imparting a vibration to a seat belt or the steering.

In the present exemplary embodiment, the photoelectric conversion system 8 captures the periphery, such as the front direction or the rear direction, of the vehicle.

FIG. 8C illustrates the photoelectric conversion system 8 in a case where the photoelectric conversion system 8 captures the front direction of the vehicle (an imaging range 850). The vehicle information acquisition apparatus 810 sends an instruction to the photoelectric conversion system 8 or the photoelectric conversion apparatus 100. With this configuration, it is possible to further improve the accuracy of distance measurement.

In the above description, an example has been described where a vehicle is controlled to avoid colliding with another vehicle. Alternatively, the present exemplary embodiment is also applicable to control for automatically driving a vehicle by following another vehicle, or control for automatically driving a vehicle so as to stay in a lane. Further, the photoelectric conversion system 8 can be applied not only to a vehicle such as an automobile but also to a moving body (a moving apparatus) such as a vessel, an aircraft, or an industrial robot. The moving body includes one or both of a driving force generation unit that generates a driving force mainly used to move the moving body, and a rotating body mainly used to move the moving body. The driving force generation unit can be an engine or a motor. The rotating body can be a tire, a wheel, a screw of a vessel, or a propeller of a flying object. Additionally, the photoelectric conversion system 8 can be applied not only to a moving body but also to a device widely using object recognition, such as an intelligent transportation system (ITS).

In the specification, the expressions "A or B", "at least one of A and B", "at least one of A and/or B", and "one or more of A and/or B" include all the possible combinations of the listed items, unless explicitly defined. That is, it is understood that the above expressions disclose all of a case where at least one A is included, a case where at least one B is included, and a case where both of at least one A and at least one B are included. This is also similarly applied to the combination of three or more elements.

The above exemplary embodiments can be appropriately changed without departing from their technical ideas. The disclosed content of the specification includes not only the items described in the specification but also all the items that can be understood from the specification and the drawings attached to the specification. The disclosed content of the specification includes a complement of the concepts described in the specification. That is, for example, if the specification states that "A is larger than B", and even if the specification omits the statement that "A is not larger than B", the specification can be said to state that "A is not larger than B". This is because the statement that "A is larger than B" is based on the premise of the consideration that "A is not larger than B".

According to the disclosure, it is possible to perform optimal control when a gradation signal and an event signal are output.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-107675, filed Jun. 30, 2023, which is hereby incorporated by reference herein in its entirety.

What is claimed is:
1. A conversion apparatus comprising:
a pixel array unit in which a plurality of first pixels that generates gradation signals indicating amounts of incident light and a plurality of second pixels that generates event signals are two-dimensionally disposed;
a reading unit configured to read the gradation signals and the event signals from the pixel array unit; and
a control unit configured to change an output data rate of the gradation signals and an output data rate of the event signals,
wherein a first pattern for outputting the gradation signals at a first output data rate and outputting the event signals at a second output data rate and a second pattern for outputting the gradation signals at a third output data rate different from the first output data rate and outputting the event signals at a fourth output data rate different from the second output data rate are switched.

2. The conversion apparatus according to claim 1, wherein in a case where the first output data rate is greater than the third output data rate, the second output data rate is smaller than the fourth output data rate, and in a case where the first output data rate is smaller than the third output data rate, the second output data rate is greater than the fourth output data rate.

3. The conversion apparatus according to claim 1, wherein the control unit controls the pixel array unit, thereby changing at least one of the output data rate of the gradation signals and the output data rate of the event signals.

4. The conversion apparatus according to claim 3, wherein the control unit controls the reading unit, thereby changing at least one of the output data rate of the gradation signals and the output data rate of the event signals.

5. The conversion apparatus according to claim 3, wherein the control unit controls the pixel array unit and changes the number of times at least either the gradation signals or the event signals are read from the pixel array unit, thereby changing at least one of the output data rate of the corresponding gradation signals and the output data rate of the corresponding event signals.

6. The conversion apparatus according to claim 3, wherein the control unit controls the pixel array unit and changes a cycle in which at least either the gradation signals or the event signals are read from the pixel array unit, thereby changing at least one of the output data rate of the corresponding gradation signals and the output data rate of the corresponding event signals.

7. The conversion apparatus according to claim 1, wherein the control unit controls the reading unit, thereby changing at least one of the output data rate of the gradation signals and the output data rate of the event signals.

8. The conversion apparatus according to claim 7, wherein the control unit controls the reading unit to decrease the number of signals to be output from the reading unit compared to the number of signals corresponding to at least either the gradation signals or the event signals to be input to the reading unit in a predetermined length of time, thereby changing at least one of the output data rate of the corresponding gradation signals and the output data rate of the corresponding event signals.

9. The conversion apparatus according to claim 7, wherein the control unit controls the reading unit to change a cycle in which at least either the gradation signals or the event signals are output from the reading unit, thereby changing at least one of the output data rate of the corresponding gradation signals and the output data rate of the corresponding event signals.

10. The conversion apparatus according to claim 1, wherein the control unit switches the first and second patterns according to a set mode.

11. The conversion apparatus according to claim 1, wherein the pixel array unit is divided into a plurality of pixel regions, each including at least one of the first pixels and at least one of the second pixels, and the control unit controls one pixel region of the plurality of pixel regions in the first pattern and controls the other pixel region in the second pattern.

12. The conversion apparatus according to claim 11, further comprising a region setting unit configured to set the plurality of pixel regions using at least either the gradation signals or the event signals.

13. The conversion apparatus according to claim 12, wherein the region setting unit includes a spiking neural network connected to the second pixels and sets the plurality of pixel regions using the spiking neural network.

14. The conversion apparatus according to claim 12, wherein the region setting unit includes a convolutional neural network connected to the second pixels and sets the plurality of pixel regions using the convolutional neural network.

15. The conversion apparatus according to claim 1, wherein the first pixels generate the event signals, and the second pixels generate the gradation signals.

16. The conversion apparatus according to claim 1, wherein distance information is acquired using at least either the gradation signals or the event signals.

17. The conversion apparatus according to claim 1, wherein the output data rate of the gradation signals is a data rate at which the gradation signals are output from the pixel array unit through the reading unit to outside the conversion apparatus, and the output data rate of the event signals is a data rate at which the event signals are output from the pixel array unit through the reading unit to outside the conversion apparatus.

18. The conversion apparatus according to claim 1, wherein the event signals indicate changes in the amounts of the incident light.

19. A moving body comprising:
the conversion apparatus according to claim 1; and
a control apparatus configured to control a movement of the moving body.

20. A device comprising:
the conversion apparatus according to claim 1, and
at least any of:
an optical apparatus configured to guide light to the conversion apparatus;
a control apparatus configured to control the conversion apparatus;
a processing apparatus configured to process a signal output from the conversion apparatus;
a display apparatus configured to display information obtained by the conversion apparatus;
a storage apparatus configured to store information obtained by the conversion apparatus; and
a mechanical apparatus configured to operate based on information obtained by the conversion apparatus.

* * * * *